F. E. GOLDSMITH.
COATING MACHINE.
APPLICATION FILED JAN. 22, 1913. RENEWED FEB. 29, 1916.

1,178,312.
Patented Apr. 4, 1916.
8 SHEETS—SHEET 1.

WITNESSES

INVENTOR

Attorney

F. E. GOLDSMITH.
COATING MACHINE.
APPLICATION FILED JAN. 22, 1913. RENEWED FEB. 29, 1916.

1,178,312.

Patented Apr. 4, 1916.
8 SHEETS—SHEET 4.

F. E. GOLDSMITH.
COATING MACHINE.
APPLICATION FILED JAN. 22, 1913. RENEWED FEB. 29, 1916.

1,178,312.

Patented Apr. 4, 1916.
8 SHEETS—SHEET 7.

UNITED STATES PATENT OFFICE.

FREDERICK E. GOLDSMITH, OF HAMILTON, OHIO, ASSIGNOR TO CERAMIC MACHINERY CO., OF HAMILTON, OHIO, A CORPORATION OF OHIO.

COATING-MACHINE.

1,178,312. Specification of Letters Patent. Patented Apr. 4, 1916.

Application filed January 22, 1913, Serial No. 743,444. Renewed February 29, 1916. Serial No. 81,290.

*To all whom it may concern:*

Be it known that I, FREDERICK E. GOLDSMITH, a citizen of the United States, residing at Hamilton, State of Ohio, have invented certain new and useful Improvements in Coating-Machines, of which the following is a specification.

My invention relates to coating machines for applying coating to tiles and similar objects.

The invention will be described throughout in connection with a machine designed for coating tiles. It is to be understood that modifications may be made as required to adapt it for coating other similar articles.

Among the principal objects are to provide, in a single machine, two different kinds of coating devices to be used alternatively or together for different kinds of work; to arrange a pressure-roll so that it may be longitudinally adjusted to coöperate with either of the coating devices; to also combine with this arrangement provision for the necessary vertical adjustment of the pressure-roll; to vertically adjust one of the coating devices and to accommodate the driving mechanism to this vertical adjustment; to provide a novel arrangement of driving mechanism including a yielding element to prevent breakage; to provide a coating agitator in immediate relation to one of the coating devices; to provide a novel form of pump for the coating and a readily removable reservoir which, in fact, is an operative part of the pump, and to provide an auxiliary reservoir to compensate for variations in the pump action in certain cases.

The invention also comprises improvements in various other parts of the machine, which will be explained in connection with a detailed description of the accompanying drawing, which shows one exemplifying embodiment of the invention.

Figure 1:
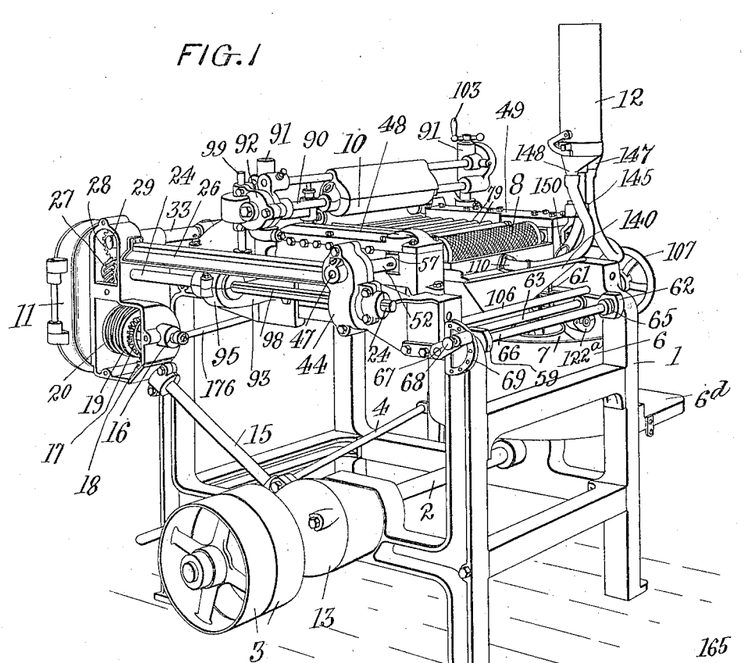
Figure 1 is a perspective view looking from the rear right side.

Referring first to Fig. 1, 1 designates a frame carrying a main drive shaft 2, on which are fast and loose pulleys 3. A belt shifter is provided adjacent to the pulleys and rod 4 connected with the shifter extends across the machine, and at the farther side, which is the operator's position, is provided with a handle 5, concealed in Fig. 1 but shown in Figs. 2, 3, etc. At the farther side of the machine is a shield 6 inclosing coating tube or tank 7. On top of the machine is large coating roll 8 and small coating rolls 9, also pressure-roll 10, which is adjustable longitudinally on the top of the frame to bring it over the small rolls or the large rolls. In Fig. 1 the pressure roll is shown moved toward the feed end of the machine, away from the large roll and over the small coating roll. At the front is a case 11 containing change gears to vary the driving speeds. The auxiliary tank or reservoir 12 is also shown in position.

Adjacent to the drive pulleys is a casing 13 containing bevel gears 14 (see Fig. 3) driving a diagonally-arranged shaft 15. This leads to a rear compartment of gear case 11, in which is a short shaft 16 carrying a loose bevel gear 17. Shaft 15 has a pinion 18 engaging the gear. Shaft 16 is normally caused to revolve with gear 17 by a slip connection comprising a clutch-member 19 splined to the shaft and pressed against gear 17 by spring 20, the other end of which rests against an adjustable collar 21. Back of gear 17 is a plate 22 pinned to shaft 16.

Engagement of clutch 19 with gear 17 is by means of serrations or teeth 23 (Figs. 11 and 3) having a considerable angle, such as approximately 45°. Fast pulley 3 drives main shaft 2 and diagonal shaft 15 positively, and pinion 18 thus drives gear 17 positively. Gear 17 drives shaft 16 through clutch 19 under ordinary conditions, but if a tile jams in passing through the machine or any other stoppage of parts driven by shaft 16 occurs, teeth 23 will rub over each other and clutch 19 will be pushed back against its spring 20, permitting gear 17 to continue to rotate without moving shaft 16, until the main drive can be stopped or the obstruction removed. This prevents breakage in such emergencies.

Figures 3, 10, 10A:
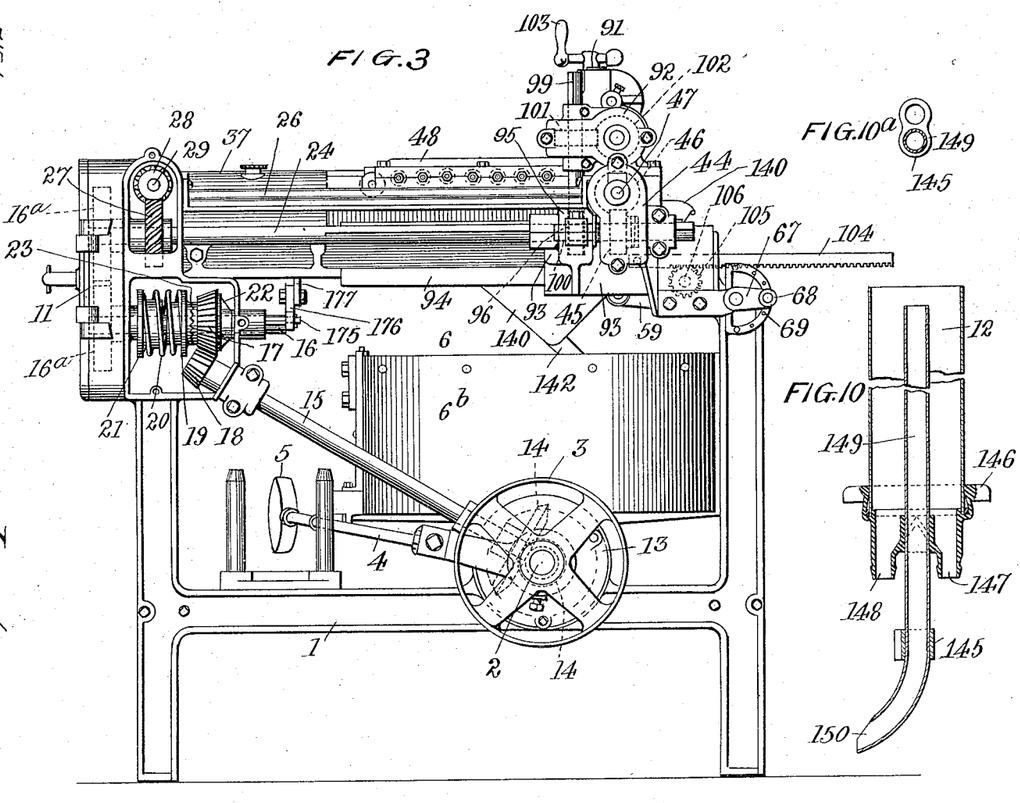
Fig. 3 is a side elevation from the same side as Fig. 2.
Fig. 10 is a vertical section of the auxiliary reservoir.
Fig. 10a is a detail of a supporting device for the auxiliary reservoir.
Figure 11:
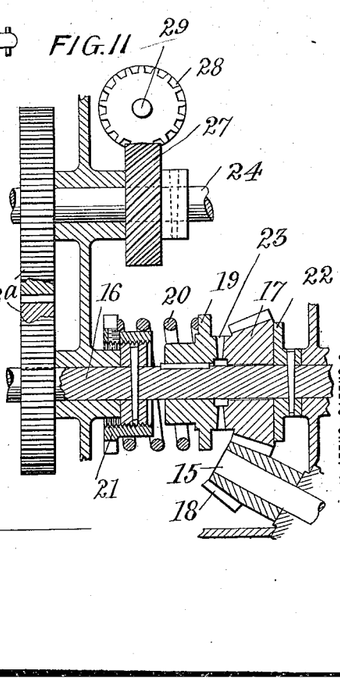
Fig. 11 is an enlarged section of a part of the driving gears showing the slip device.

Longitudinally carried in the upper part of the frame, on the same side as the drive pulleys and shaft 15, is a shaft 24 (Figs. 1, 3, 11, etc.) This serves for driving the feed belt, coating roll and pressure roll and is itself driven from shaft 16 by changeable gearing of any suitable type (not shown) in casing 11. Shaft 24 is protected from down-dropping trash of all kinds by a guard 26. This is one example of the quite complete protection afforded in the machine for practically all the working parts. This protection is especially important in tile-coating machinery because the coating material contains highly abrasive substances which would seriously injure the parts if allowed to come in contact with them.

Near its front end, longitudinal shaft 24 carries a spiral gear 27 engaging another spiral gear 28 on transverse feed belt drive shaft 29. Opposite the end of shaft 29 is shaft 30 which carries the forward end of the feed belt 31. Shaft 30 is carried in bearings 32 and is connected to shaft 29 by universal coupling 33 to compensate for any disalinement of the two shafts. The other end of belt 31 is carried on a roller 34 and this roller is, in turn, supported in bearings 35. To the bearings are connected rods 36 and these are supported in a base 37, over which the belt runs. Toggle links 38 are pivoted at their outer ends to the base 37 and rods 36, respectively, and at their inner ends they are pivoted together and to the transverse rod 39 terminating at 40 convenient to the hand of the operator. By pulling out rod 40 the toggles draw roll 34 toward the front of the machine and loosen the belt so that it may be easily removed. By pushing the rod back the toggles are straightened out and tighten the belt. The belt is tensioned by idler roll 41 adjusted by screws 42 and hand nuts 43.

Figure 14:
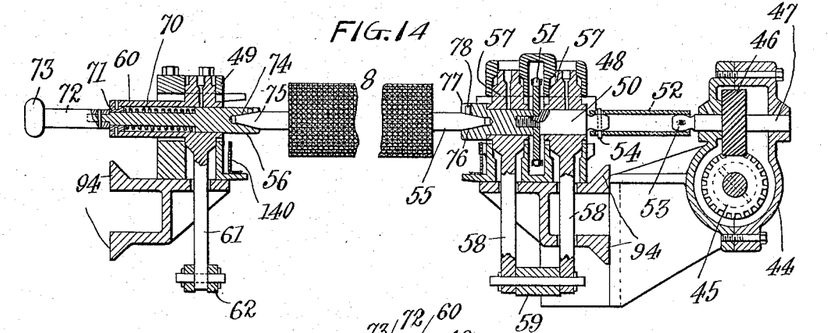
Fig. 14 is a section in the axial plane of the main coating roll.

Longitudinal shaft 24 is journaled at its rear end in a gear housing 44 fixed to the frame and therein the shaft carries a spiral gear 45 meshing with spiral gear 46 on shaft 47 journaled in the upper part of the housing. This short shaft is for driving large coating roll 8, as will appear. The upper part of the frame carries at one side a longitudinal housing 48, and at the other housing 49. The box-like housing 48 is for the accommodation of driving and supporting arbors for the roll shafts at that side of the machine and similar housing 49 accommodates the free, carrying arbors of the roll shafts on its side of the machine. Rearwardly in housing 48, as best seen in Fig. 14, is main roll drive shaft 50 in endwise proximity to short shaft 47, previously mentioned. Shaft 50 is conveniently composed of two pieces screwed together and gripping sprocket 51 between them. Shaft 50 is connected to shaft 47 in such a way that the former may be vertically adjusted in relation to the latter, and in a preferred form this connection consists, as shown, of a tube 52 resting on bulb-like ends 53 of the respective shafts and caused to rotate with them by pins 54 passing through the heads of the shafts and engaging short slots in the tube. Shaft 50 constitutes an arbor or drive shaft for shaft 55 of coating roll 8. The opposite end of the coating roll shaft is carried by a shaft or arbor 56. The arbor 50 is rotatably mounted in bearings 57 vertically movable in housing 48, and these bearings in turn are at the ends of vertical links 58 connected at their lower ends to a supporting arm 59. Arbor 56 runs in a bearing 60 vertically movable within housing 49, and this bearing is carried by a link 61 connected at its lower end to an arm 62. Arms 59, 62, are fulcrumed on a transverse shaft 63, best seen in Fig. 2. The rearward ends of the arms are provided with slots 64 engaged by eccentrics 65 carried on an adjusting shaft 66. On the end of this shaft (Figs. 1 and 3) is a crank arm 67 carrying a spring-pressed handle 68, the inner end of which fits into recesses or notches in a sector 69. Now, by pulling out the plunger handle 68 crank arm may be moved up or down as seen in Figs. 1 or 3, thus rotating shaft 66 and eccentric 65. Arms 59 and 62 are thus simultaneously moved so as to raise or lower bearings 57, 60, and thus roll shaft 55 is vertically adjusted and kept at the same time in proper alinement. Universal driving connection 52 permits it to be driven from shaft 47 in any of its positions.

The free arbor 56 for the large coating roll, it has been explained, rotates in bearing 60, which is made long enough to accommodate a spring 70 compressed between a shoulder formed on the arbor and a collar 71 secured in the end of the bearing. The arbor is also provided with an extension 72 terminating in a handle knob 73. At its other end, the arbor is provided with a tapered socket 14 in which the tapered end 75 of shaft 55 movably rests. Shaft or arbor 50 is provided with a similar socket 76 and at one side adjacent to the socket the arbor has a slot 77. This end of the roll shaft is also tapered and provided with a pin 78 fitting slot 77. By pulling out knob 73, arbor 56 is retracted from engagement with tapered end 75 of the roll shaft and the shaft may then be pulled out of the socket in arbor 50. The same or another roll may then be quickly inserted by simply inserting its driving end in socket 76 within pin 78 in slot 77, and then permitting arbor 56 to engage the other end of the shaft. This quick detachable arrangement for the coating roll is of great importance in order to permit rapid cleaning and replacement of the roll or the substitution of a different roll, as may be desired.

Adjacent to the large coating roll and toward the feed end of the machine are a plurality of small coating rolls 79. These rolls, considered as a group, constitute a second coating device. They are called small rolls mainly for identification as the other roll 8 is called a large roll for a similar purpose, the comparative size being of minor importance. Usually, however, the group of rolls 79 are much smaller than roll 8, which is usually employed alone. Between feed belt 31 and the foremost roll 79 may be placed a feed roll 80, and to the rear of roll 79 may be placed a specialized roll 81 for various purposes, such as modifying the coating effect of roll 79 in different ways. Rolls 80 and 81 may be, and in convenient constructions, they are driven in common with rolls 79, by means which will now be described.

Rolls 79, and, if desired, 80 and 81 also, are carried at one side by driving arbors 82 mounted in bearings in housing 48 and at their other ends by arbors 83 carried in bearings in housing 49. Driving arbors 82 are substantially like the driving arbor 50 for the large coating roll, and driven arbors 83 are substantially like arbors 86, similar means of quickly inserting and removing the roll shafts 84 being provided, as will be apparent by comparison with Fig. 14. The principal difference is that the arbors are mounted in fixed bearings in the housing instead of bearings vertically movable, as is the case with the large coating roll 8. Each of the driving arbors 82 carries a small sprocket 85 (Figs. 9 and 12) within housing 48. The chain 86 passes over the upper teeth of these sprockets and around sprocket 51 on main coating roll arbor 50. Directly above the small sprockets the cover of housing 48 is provided with a guide or rail 87 fitting close to the uppermost teeth. By this, the chain is guided and held in engagement with all of the small sprockets. Above the large sprocket 51, however, the cover is upwardly recessed as at 88 to permit vertical movement of arbor 50, and the chain has sufficient slack to permit this movement. All of the coating roll shafts and the shafts of rolls 80 and 81, if used, are thus driven in an obvious manner from the main roll drive shaft 50.

It is usually necessary to apply some pressure to the tiles as they pass over the coating rolls. For this I provide a pressure roll 10 previously pointed out in Fig. 1. I provide means for adjusting this roll longitudinally in the machine so that it may cooperate with the small roll 79 or with the large roll 8. It is, of course, necessary to also arrange driving means for rotating the pressure roll in any of its desired positions. Means for adjusting the roll vertically to vary the pressure to accommodate different sized tiles is also provided. The pressure roll is carried by a shaft 90 mounted in bearings carried by standards or posts 91. At the drive side the shaft bearings are provided in a gear housing 92. Posts 91 and other parts pertaining to the pressure roll are carried by slides 93 at opposite sides of the machine. These engage rails or guides 94 carried by the frame. Slide 93 at the driving side also carries a gear housing 95 through which longitudinal shaft 24, previously mentioned, passes. Within housing 95, shaft 24 carries a spiral gear 96 slidable on the shaft and engaging it by means of a key or feather 97 engaging shaft channel 98. The slide carries a vertical shaft 99, the lower end of which passes into gear housing 95 and there carries spiral gear 100 engaging gear 96. Slidably mounted on shaft 99 and engaging it by means of feather is spiral gear 101 engaging gear 102 on the end of pressure roll shaft 90. Gears 101, 102, are carried within gear housing 92. Bearings carrying the pressure roll shaft are traversed up and down on posts 91 by means of a hand-wheel 103 and gearing, the details of which are not of special importance. This vertical adjustment of the roll shaft is accommodated by spiral gear 101 sliding on its shaft 99. The movement of the whole pressure roll unit on the guides 94 is accommodated by spiral gear 96 sliding on shaft 24. Means for longitudinally adjusting the pressure roll by moving slides 93 on their guides will now be described.

Figures 12, 13:
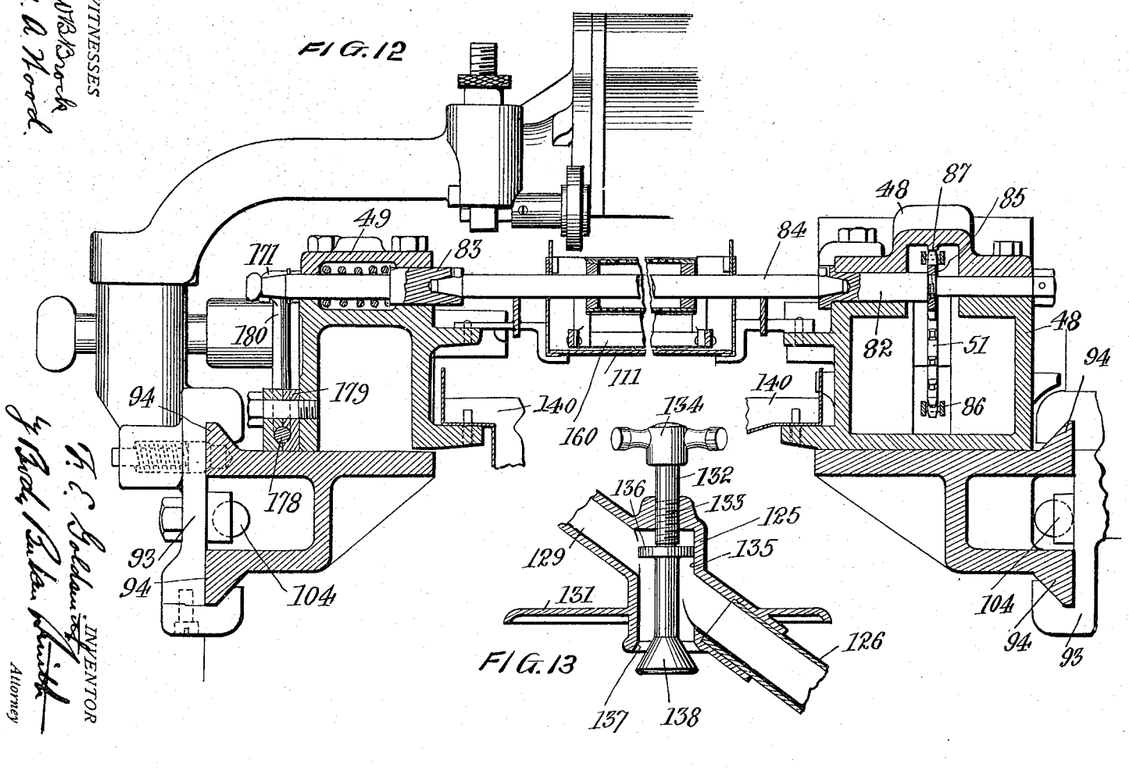
Fig. 12 is an enlarged fragmentary section transversely through the machine in the axial plane of one of the small rolls.
Fig. 13 is a sectional detail of the pump valve.

To each of the slides is connected a rack bar 104, as best shown in Fig. 12. These bars extend toward the rear and are engaged by pinions 105 on a transverse shaft 106. On the outward end of this shaft is hand wheel 107. Evidently, by rotating the hand wheel the pinions are simultaneously turned and move the rack bars, and so move the slides along their guides.

Under the main or large coating roll 8 is a pan 108 (Fig. 2) arranged to overflow at 109. At the rear of the pan is a pipe connection 110 for the supply of coating.

Under the small rolls 79 is a pan 111 having a front wall 112 terminating just below the upper level of the rolls and an adjustable gate 113 at the rear wall. Coating supply to this pan overflows at the top of gate 113. Coating is supplied to the pan through connection 114 at the bottom thereof. Means for supplying the coating will now be described.

Figure 6:
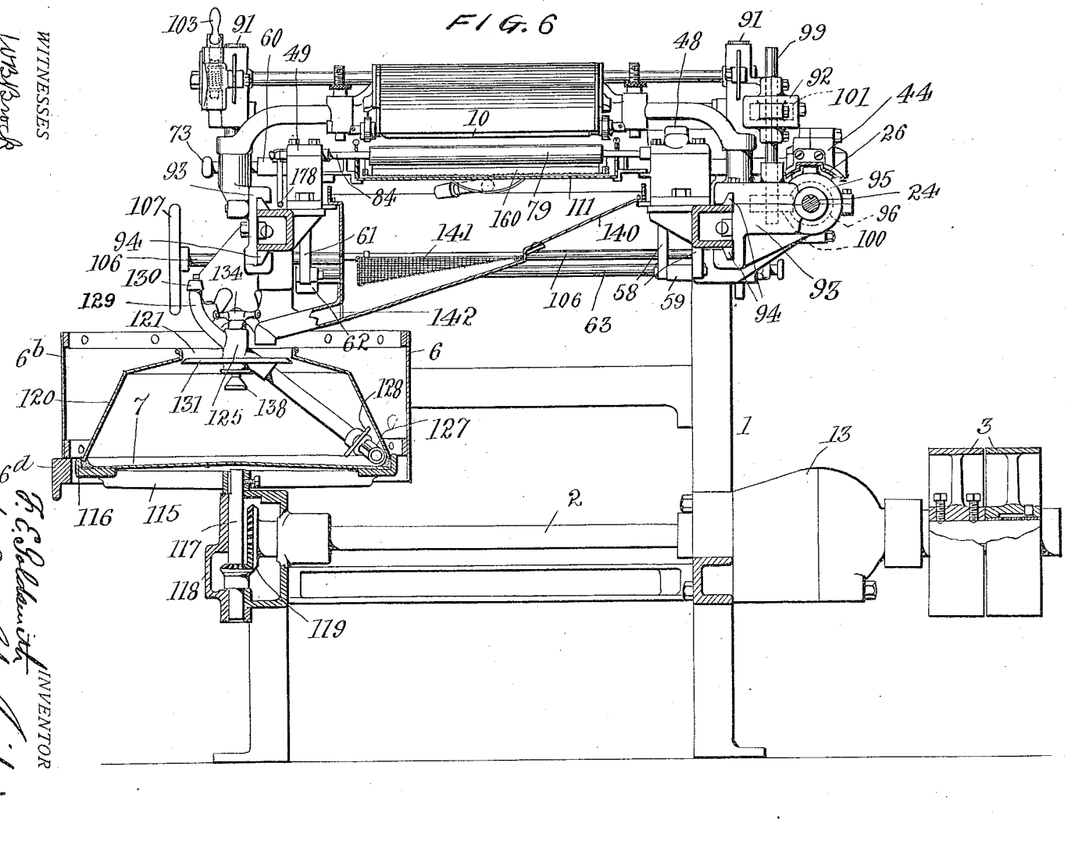
Fig. 6 is a transverse vertical section.
Figures 15, 16:
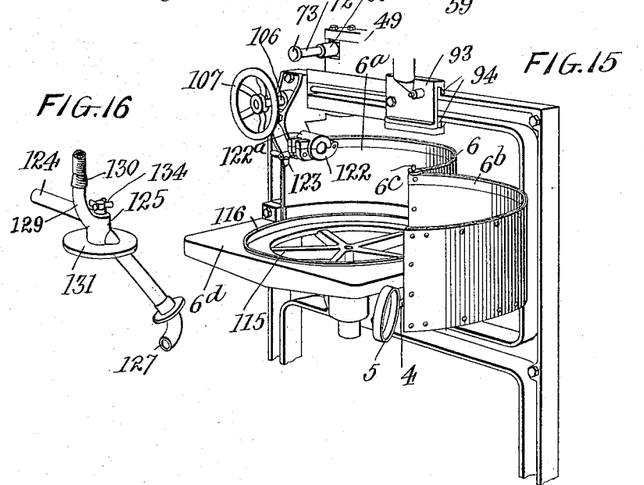
Fig. 15 is a perspective of the coating tank table and adjacent parts.
Fig. 16 is a perspective view of the pump valve removed from working position.
Figure 17:
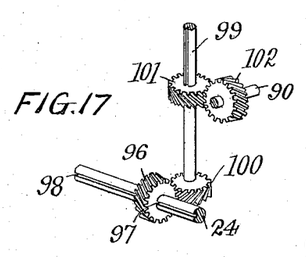
Fig. 17 is a perspective diagram of the driving connections for the pressure roll.

At the side of the machine opposite the drive pulleys is a rotary support or whirling table 115 for the coating tank or tub 7 (see Figs. 6 and 15). The periphery of the table has an upturned lip 116 to securely hold the tub. The table is carried by a vertical shaft 117 mounted in bearings in the housing 118. In this housing are beveled gears 119 carried by main shaft 2 and vertical shaft 117 to rotate the table at the proper speed. The tub 7 has inclined side walls 120 and an open top 121. Adjacent to the guard 6 which surrounds the tub, the frame carries a socket 122 provided with a hinged cover 122$^a$ and a swing nut 123. The socket is for stem 124 of the coating valve 125 shown detached in Fig. 16. When the valve stem is secured in the socket the valve is in operative relation to the tub, as shown in Fig. 6. The valve is shown in section in Fig. 13. From the valve body 125 a supply pipe 126 depends into the tub and at its lower end is bent to form a part 127 tangent to the periphery of the tub at this point. Above the tangent portion which terminates in the supply opening is a shield 128. At the other side of the valve-body is the discharge pipe 129 terminating in hose connection 130 to which a hose may be connected and led either to the connection for the large roll pan 108 or the small roll pan 111 above described, or to the auxiliary reservoir, as will appear later.

The valve-body carries a plate 131 which, when in position, lies just within and slightly below the top opening 121 of the tub. Within the valve-body is valve-stem 132 having a screw 133 engaging the body at the top. On the upper end of valve-stem is a handle 134. The valve-body has a cylindrical bore 135, and in this is a valve-disk 136. At the lower end of the bore 135 is a conical valve-seat 137 and valve-stem 132 carries a conical valve 138 to coöperate with this seat.

When the machine is in operation the coating tub 7 is rotated at proper speed by the table 115. Centrifugal force and the momentum of the coating fluid combine to force it up through supply pipe 126 to the valve. If the valve-stem is uppermost in the valve-body, cone valve 138 will entirely close the bottom opening of the valve and all the fluid will come through the discharge pipe 129, coating pan or pans, or through the auxiliary reservoir. To decrease the amount of supply from discharge pipe 129, the conical valve 138 may be opened more or less, and then a certain part of the fluid pumped up through pipe 126 will return directly into the tub. The valve is usually adjusted so that coating material in excess of the amount actually required for use is supplied either to pan 108 or pan 111, or to both of them. The excess coating flows from the pans either over the adjustable gate 113 of pan 111 or over the edge 109 of pan 108 and drops into the large trough 140, best seen in Figs. 2 and 6, which underlies all of the coating devices and pans. Near the bottom of trough 140 is a screen 141, and below this a discharge pipe 142 leads to the open top 121 of the tub above valve plate 131. The excess coating is thus all conducted back to the tub.

Guard 6 surrounding the coating tub has been previously mentioned. This guard has a stationary part 6$^a$ at the back of the tub and a movable part 6$^b$ (Fig. 15) hinged to the stationary part at 6$^c$. This may be easily swung aside, as shown in Fig. 15, to permit removal of the tub, and when closed rests on a stationary shelf 6$^d$ at the front of the rotating table.

Fig. 1 shows the auxiliary reservoir 12 in position on the machine, to which it is secured by a clamp 145, and Fig. 10 shows the reservoir in vertical section. It comprises a base 146 having a supply connection 147 and a similar discharge connection 148 at the bottom. Within the reservoir 12 a pipe 149 extends up nearly to the top. This pipe passes through the bottom of the reservoir and receives the clamp 145. The lower end of the pipe is curved and terminates at 150 above the return trough 140. When this reservoir is in use a hose is led from the discharge connection 130 of the pump to one of the bottom connections of the reservoir and the other bottom connection is connected by a hose with either of the coating pans. The coating material is then pumped into the reservoir and the valve is adjusted usually so that a lttle more is supplied than is required for use in the pan. If the reservoir fills nearly to the top, the surplus will run off through overflow pipe 149. This arrangement is desirable when the coating machine is driven by a device which may vary in speed; for instance, a line-shaft to which other machinery may be connected. If the coating pump were connected direct with one of the pans, the speed of the line-shaft might be reduced and the pump would in that case fail to supply sufficient coating material. But when connected to the reservoir the pump is adjusted to supply an excess of coating material and a reserve supply is maintained in the reservoir, and when the speed of the pump falls off, more or less, this reserve amount is delivered to the coating pan. At the same time, if the shaft speeds up too much coating cannot be furnished because the overflow 149 takes care of any excess.

Figures 2, 9:
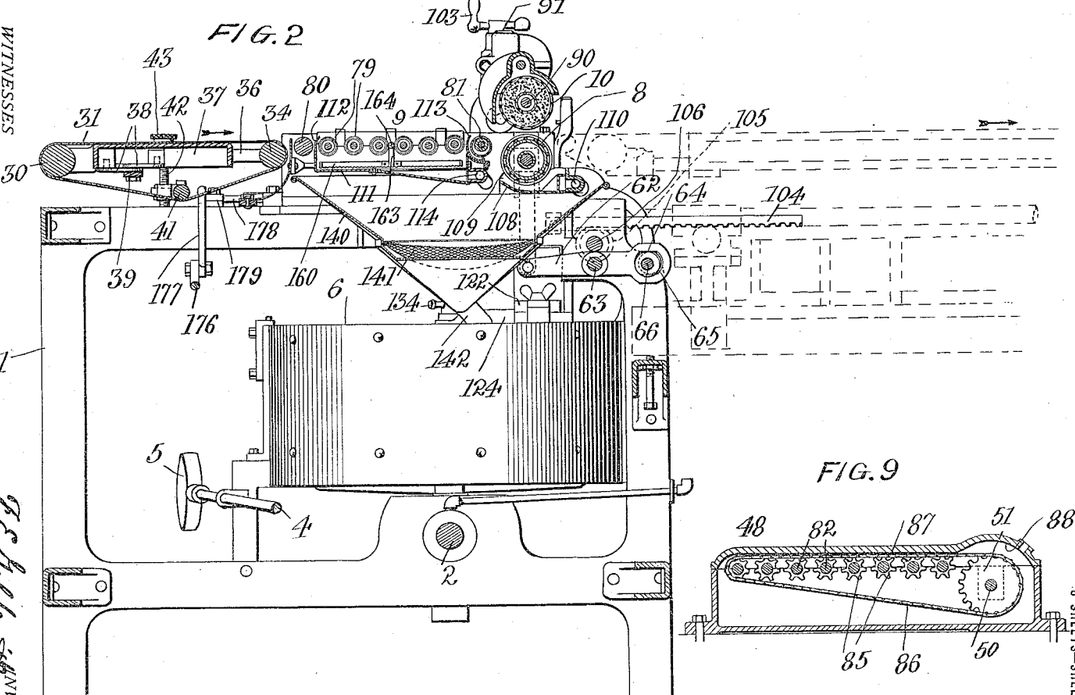
Fig. 2 is a longitudinal vertical section.
Fig. 9 is a longitudinal section through the housing containing mechanism for directly driving the coating rolls.
Figure 4:
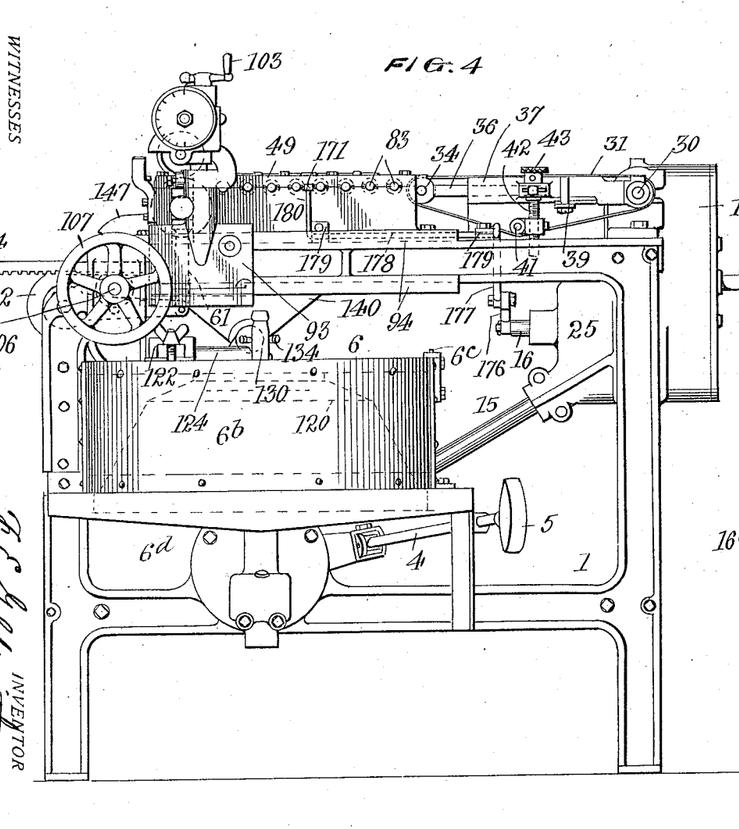
Fig. 4 is an opposite side elevation.
Figure 5:
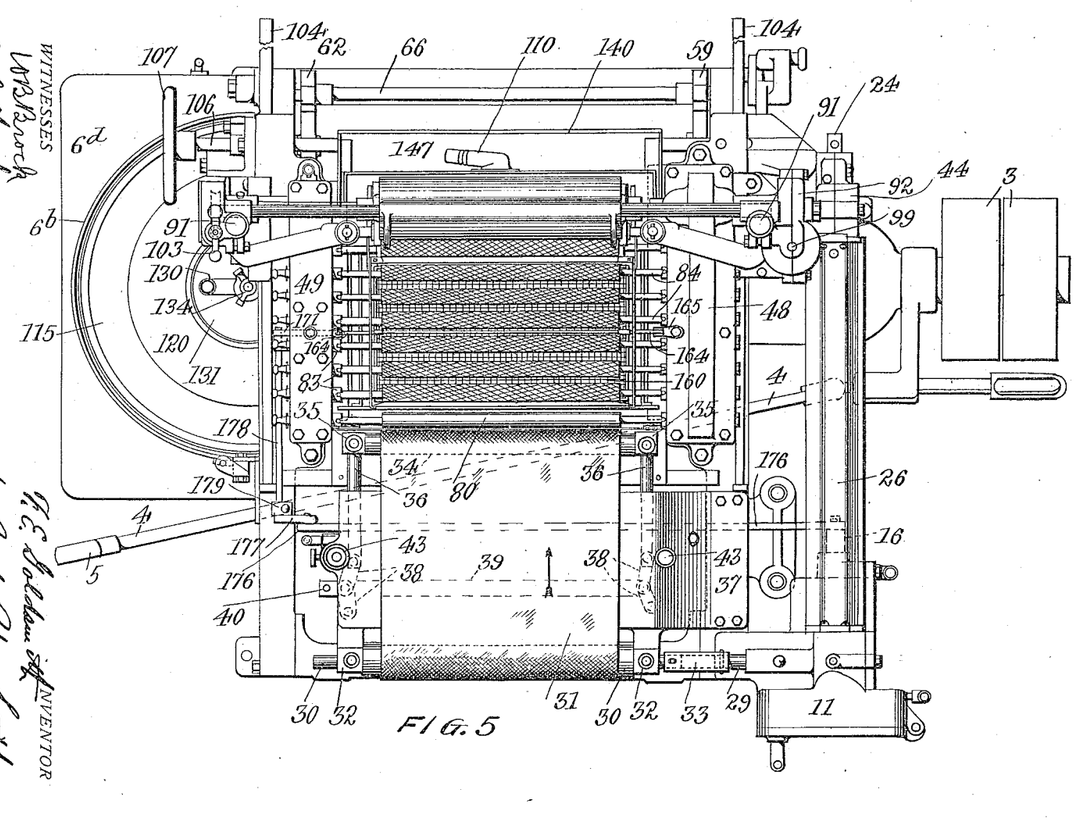
Fig. 5 is a top plan.
Figures 7, 8:
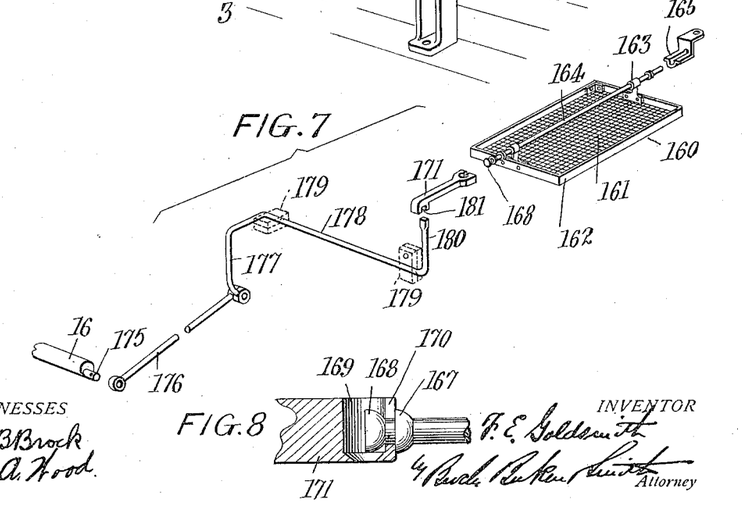
Fig. 7 is a perspective of the agitator for the small coating rolls and the driving mechanism therefor, the parts being shown disconnected for greater clearness.
Fig. 8 is an enlarged detail of one of the driving connections of Fig. 7.

It has been found that coating material supplied to a coating device of the general character of the small rolls 79 is likely to settle in the pan, and it is desirable to prevent this. For this purpose I provide in pan 111, beneath the rolls, an agitator 160 (Figs. 2 and 7). This consists of a piece of wire mesh 161 carried by frame 162. Short lugs 163 rise from the frame and to these is connected a rod 164 supported at one end by a socket 165 secured to housing 48 (see Fig. 5). Near the other end the rod may rest on the side wall of the pan, or be otherwise suitably supported. This end of the rod terminates in two separated knobs 167, 168, forming a quick detachable connection with a socket 169 and slot 170 in connecting link 171 (Figs. 7 and 8). To vibrate the agitator, shaft 16 previously described, which carries the slip connection, is extended outward from gear box 25, as shown in Figs. 3, 4, etc., and is there provided with an eccentric pin 175. This pin carries one end of pitman 176. The other end of the pitman is connected to arm 177 of rock-shaft 178, mounted in bearings 179. At the opposite end to arm 177, arm 178 has an upstanding arm 180 engaged by a socket 181 on the end of connecting link 171 opposite from socket 169, previously mentioned. As shaft 16 continuously revolves in driving the coating and pressure rolls, eccentric pin 175 reciprocates pitman 176, thus causing the rock-shaft, acting through link 171, to move rod 164 endwise and thus oscillate the agitator 160, continuously stirring up and keeping in proper condition the coating material in trough 111 adjacent to the small coating rolls.

When tiles pass from the coating device or devices, as shown in Fig. 2, they are received by a carry-off apron 200 shown in dotted lines, and the end of this apron adjacent to the coating machine is made adjustable so as to receive tiles from the small coating rolls when the large roll is removed, or to receive them from the large roller when that is in place, as shown in the figure.

It is almost obvious how the coating pump can be connected to supply both the coating devices at once if desired. It is sufficient to explain that one way of doing this is to provide a Y or T connection between the pump discharge 130 and the coating devices. In a similar way, when the coating is first led to the auxiliary reservoir 12, the discharge connection thereto may be provided with a branch leading to both of the coating devices, if desired.

The large coating roll is to be used principally for tiles, such as wall tiles, that are to be given a thin coating. It is found that a single roll of large diameter is most effective in giving a uniform coating of sufficient thickness when the tiles are run through at comparatively high speed, provided the tiles are not too hard to rapidly absorb the moisture in the coating. Another advantage of the large roll in coating is the fact that, when desired, it will deposit coating material on the face of the tile without any coating extending up around the edges. However, if it is desired to have a small amount of coating deposited around the edges of the tile, the construction of the large roll may readily be modified to bring about this result. So for either method of coating the large roll can be used successfully at high speed with light coating material.

If the coating of the tile is to be heavy, or the tiles are hard and dense, it is essential, when one roll only is used, that the machine run slowly to do satisfactory work. This slow running cuts down the capacity of the machine to such an extent that it may not be economical to operate the machine in this manner. To overcome this objection, in plants where it is necessary for the machine to work with both light and heavy coating, small rolls and pan are used instead of the large roll just mentioned. The plurality of small rolls in connection with the pan allows the tile to run at high speed and at the same time to absorb sufficient coating, because the tiles are in contact with the coating for a sufficiently long period of time while passing over the pan. The function of the smaller rolls in certain cases is merely to traverse the tiles and support them on the upper surface of coating material in the pan, the coating or glaze in this case contacting directly with the tile. One, two, or more rolls can be used, the pans being, of course, of proper size to accommodate the number of rolls in operation, so that the time allowed for absorption of glaze by the tiles can be varied to suit the requirements. To further increase the coating capacity of the machine, the large roll can be used in conjunction with the small rolls and pans, thereby increasing the length of time the tiles are in contact with the coating material.

With another method of operation, the level of the glaze in the small roll pan can be varied within certain limits. The level may rest slightly above the top of the small rolls, and in this case the tile will pass through the glaze so that some of it is deposited on the edges of the tile. When this is not desired, by lowering the glaze so that it is not higher than the tops of the small rolls, sufficient glaze is carried up by said rolls to accommodate the tile on the face only. It is evident, therefore, that with the small rolls and pan, either light or heavy glaze may be used just as light or heavy glaze may be used in connection with the large roll, as above described.

I claim:

1. In a coating machine, the combination of a coating device, means for feeding tiles or the like, a coating tank, means for rotating the tank, a stationary delivery pipe therein terminating near the bottom, an adjustable valve in said pipe, and a connection from said pipe to the coating device.

2. In a coating machine, the combination of a coating device, means for feeding tiles or the like, a coating tank, means for rotating the tank, a stationary delivery pipe therein terminating near the bottom, a return passage in said pipe communicating with the tank and valve, means for regulating the amount of coating flowing back through the return passage and the amount passing to the coating device, and a connection from said pipe to the coating device.

3. In a coating machine, the combination of a rotary table, a tank thereon having inclined sides and an open top, a valve-body having a baffle plate within the top of the tank, a supply pipe depending from the valve-body and having a tangential opening, a discharge pipe leading from the valve-body, a return opening in the body communicating with the tank, and a valve regulating said return opening.

4. In a coating machine, the combination of a rotatable table, a tank thereon having inclined sides and an open top, a valve-body having a baffle plate within the top of the tank, a supply pipe depending from the valve-body and having a tangential opening, a baffle plate on the supply pipe adjacent to the supply opening, a discharge pipe leading from the valve-body, a return opening in the body communicating with the tank, and a valve regulating said return opening.

5. In a coating machine, the combination of two coating devices, means for feeding tiles or the like, means for supplying coating to the devices, and a pressure roll adjustable to coöperate with either of said devices.

6. In a coating machine, the combination of a coating pan containing a plurality of small coating rolls, a large coating roll outside the pan, feeding means for supplying coating to the pan or to the large roll, a pressure roll, and means for adjusting said roll to coöperate with either the small or large coating rolls.

7. In a coating machine, the combination of a coating pan containing a plurality of small coating rolls, a large coating roll outside the pan, feeding means for tiles or the like, means for supplying coating to the pan or to the large roll, a pressure roll, means for adjusting said roll to coöperate with either the small or the large coating rolls, means for driving the coating rolls, and means for driving the pressure roll in any of its positions.

8. In a coating machine, the combination of a frame, a coating pan, a plurality of small coating rolls therein, a large coating roll, means for rotating the rolls, a feed belt, a pressure roll, and means for adjusting the pressure roll longitudinally on the frame to coöperate either with the small coating rolls or the large coating roll.

9. In a coating machine, the combination of a frame, a coating pan, a plurality of small coating rolls therein, a large coating roll, means for rotating the rolls, a feed belt, a pressure roll, means for adjusting the pressure roll longitudinally on the frame to coöperate either with the small coating rolls or the large coating roll, and means for adjusting the pressure roll vertically.

10. In a coating machine, the combination of a frame, a coating pan, a plurality of small coating rolls therein, a large coating roll, a separate coating pan for the large roll, means for rotating the rolls, a feed belt, a pressure roll, and means for adjusting the pressure roll longitudinally on the frame to coöperate either with the small coating rolls or the large coating roll.

11. In a coating machine, the combination of a frame, a coating pan, a plurality of small coating rolls therein, a large coating roll, means for rotating the rolls, a feed belt, a pressure roll, and means for adjusting the pressure roll longitudinally on the frame to coöperate with the small coating rolls or the large coating roll, and a yieldable driving member for all the moving parts mentioned.

12. In a coating machine, the combination of a frame, a coating pan, a plurality of small coating rolls therein, a large coating roll, means for rotating the rolls, a feed belt, a pressure roll, means for adjusting the pressure roll longitudinally on the frame to coöperate either with the small coating rolls or the large coating roll, means for adjusting the pressure roll vertically, and a yieldable driving member for all the moving parts mentioned.

13. In a coating machine, the combination of a frame, a coating pan, a plurality of small coating rolls therein, a large coating roll, a separate coating pan for the large roll, means for adjusting the pressure roll longitudinally on the frame to coöperate either with the small coating rolls or the large coating roll, and a yieldable driving member for all the moving parts mentioned.

14. In a coating machine, the combination of a frame, a feed belt, a coating roll, bearings therefor vertically movable in the frame, means for moving said bearings to regulate the vertical position of the roll, a drive member for the roll rotating in a fixed bearing, and a universal joint connecting the driving member and the roll to permit the adjustment thereof.

15. In a coating machine, the combination of a main coating roll, means for driving it, a plurality of small coating rolls, a large sprocket on the main roll shaft, smaller sprockets on the small roll shafts, and a chain passing about the large sprocket and engaging the small sprockets at one side whereby all the coating rolls are driven simultaneously in the same direction.

16. In a coating machine, the combination of a main coating roll, means for driving it, a plurality of small coating rolls, a large sprocket on the main roll shaft, smaller sprockets on the small roll shafts, and a chain passing about the large sprocket and engaging the small sprockets at one side whereby all the coating rolls are driven simultaneously in the same direction, means for adjusting the main roll vertically without interfering with its driving connections.

17. In a coating machine, the combination of a main coating roll, means for driving it, a plurality of small coating rolls, a large sprocket on the main roll shaft, smaller sprockets on the small roll shafts, and a chain passing about the large sprocket and engaging the small sprockets at one side whereby all the coating rolls are driven simultaneously in the same direction, means for adjusting the main roll vertically without interfering with its driving connections, a housing engaging the chain and holding it in engagement with the small sprockets, and recessed above the large sprocket to permit adjustment thereof.

18. In a coating machine, the combination of a coating roll, a pan therefor, means for supplying coating material to the pan, an agitator in the pan adjacent to the roll, and means for vibrating the agitator.

19. In a coating machine, the combination of a coating pan, a plurality of small coating rolls horizontally arranged therein, means for supplying coating material to the pan, an agitating screen in the pan below the rolls, and means for vibrating the screen.

20. In a coating machine, the combination of a coating roll, a shaft therefor, a driving arbor socketed to receive one end of the shaft, and a spring pressed retractable rotary arbor socketed to receive the other end of the shaft.

21. In a coating machine, the combination of a coating roll, a shaft therefor, a driving arbor having a socket to receive one end of the shaft, positive engaging devices carried by the shaft and arbor, a supporting arbor for the other end of the shaft, a bearing in which said arbor is rotatable and endwise movable, and a spring urging the arm normally to engage the roll shaft.

22. In a coating machine, the combination of a frame having guide rails, a coating pan between the rails, a plurality of small coating rolls therein, a large coating roll outside the pan, means for driving the rolls, slides engaging the rails, a pressure roll carried by the slides, rack bars connected to the slides, and a transverse shaft having a hand wheel and pinions to engage the rack bars whereby the pressure roll is horizontally adjusted to coöperate with the small or the large coating rolls, as desired.

23. In a coating machine, the combination of a frame having guide rails, a coating pan between the rails, a plurality of small coating rolls therein, a large coating roll outside the pan, means for driving the rolls, slides engaging the rails, a pressure roll carried by the slides, rack bars connected to the slides, and a transverse shaft having an end wall and pinions to engage the rack bars whereby the pressure roll is horizontally adjusted to coöperate with the small or the large coating rolls, as desired, a longitudinally splined shaft, a gear housing carried by one of the slides and surrounding the shaft, a gear within the housing on the shaft and splined thereto, and connections between said gear and the pressure roll for rotating the same.

24. In a coating machine, the combination of a frame having guide rails, a coating pan between the rails, a plurality of small coating rolls therein, a large coating roll outside the pan, means for driving the rolls, slides engaging the rails, a pressure roll carried by the slides, rack bars connected to the slides, and a transverse shaft having an end wall and pinions to engage the rack bars whereby the pressure roll is horizontally adjusted to coöperate with the small or the large coating rolls, as desired, a longitudinally splined shaft, a gear housing carried by one of the slides and surrounding the shaft, a gear within the housing on the shaft and splined thereto, connections between said gear and the pressure roll for rotating the same, and means for adjusting the pressure roll vertically.

25. In a coating machine, the combination of feeding means for tiles or the like, coating means, a pressure device above the coating means, means for adjusting the pressure device longitudinally and vertically, and means for driving the pressure device in any of its adjusted positions.

FREDERICK E. GOLDSMITH.

Witnesses:
F. B. YINGLING,
MARY A. GOLDSMITH.

Copies of this patent may be obtained for five cents each, by addressing the "Commissioner of Patents, Washington, D. C."